United States Patent
Yamaguchi et al.

(10) Patent No.: US 11,878,641 B2
(45) Date of Patent: Jan. 23, 2024

(54) ARRANGEMENT STRUCTURE OF WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Hiroki Hirai, Mie (JP); Makoto Higashikozono, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 213 days.

(21) Appl. No.: 17/425,984

(22) PCT Filed: Jan. 15, 2020

(86) PCT No.: PCT/JP2020/000938
§ 371 (c)(1),
(2) Date: Jul. 27, 2021

(87) PCT Pub. No.: WO2020/158375
PCT Pub. Date: Aug. 6, 2020

(65) Prior Publication Data
US 2022/0227317 A1    Jul. 21, 2022

(30) Foreign Application Priority Data

Feb. 1, 2019   (JP) .................................. 2019-017135

(51) Int. Cl.
| B60R 16/00 | (2006.01) |
| B60R 16/02 | (2006.01) |
| H02G 3/06 | (2006.01) |

(52) U.S. Cl.
CPC ....... B60R 16/0222 (2013.01); H02G 3/0616 (2013.01)

(58) Field of Classification Search
CPC ... H02G 3/083; H02G 3/0616; B60R 16/0222
See application file for complete search history.

(56) References Cited

U.S. PATENT DOCUMENTS

| 6,135,538 A | 10/2000 | Serizawa et al. |
| 2010/0263926 A1 | 10/2010 | Murayama et al. |
(Continued)

FOREIGN PATENT DOCUMENTS

| JP | 02-126957 U | 10/1990 |
| JP | 10-217875 | 8/1998 |
(Continued)

OTHER PUBLICATIONS

JP 2013247805 A; English Translation; published on Dec. 9, 2013 (Year: 2013).*
(Continued)

*Primary Examiner* — Pete T Lee
(74) *Attorney, Agent, or Firm* — GREENBLUM & BERNSTEIN, P.L.C.

(57) ABSTRACT

An arrangement structure of a wiring member includes: a first member; a second member connected to the first member to be rotatable around a rotational axis; and a plurality of electrical wires having a part disposed at least between the first member and the second member, wherein the plurality of electrical wires are disposed in parallel to each other in a direction in which the rotational axis extends (Continued)

in the part of the plurality of electrical wires disposed between the first member and the second member.

5 Claims, 3 Drawing Sheets

(56)     References Cited

U.S. PATENT DOCUMENTS

| | | | | |
|---|---|---|---|---|
| 2018/0118138 | A1* | 5/2018 | Tsukamoto | H01B 7/0045 |
| 2018/0304833 | A1* | 10/2018 | Urashima | B60R 16/0222 |
| 2019/0229509 | A1* | 7/2019 | Mita | H01B 7/0045 |

FOREIGN PATENT DOCUMENTS

| | | |
|---|---|---|
| JP | 11-198742 | 7/1999 |
| JP | 2009-179117 | 8/2009 |
| JP | 2013-247805 | 12/2013 |
| JP | 2014-099974 | 5/2014 |
| JP | 2018-114964 | 7/2018 |

OTHER PUBLICATIONS

JP 2009-179117 English Translation; published in 2009 (Year: 2009).*

Japan Office Action issued in Japan patent Application No. 2019-17135, dated Feb. 15, 2022, together with English translation thereof.

International Search Report issued in International Patent Application No. PCT/JP2020/000938, dated Mar. 17, 2020, along with an English translation thereof.

International Preliminary Report on Patentability issued in International Patent Application No. PCT/JP2020/000938, dated Mar. 18, 2021, along with an English translation thereof.

* cited by examiner

ARRANGEMENT STRUCTURE OF WIRING MEMBER

TECHNICAL FIELD

The present disclosure relates to an arrangement structure of a wiring member.

BACKGROUND ART

Patent Document 1 discloses a technique of routing a wire harness between a vehicle body and a door. In Patent Document 1, an electrical wire bundle made up of a plurality of electrical wires bundled together is extended from the vehicle body to the door in a position away from a rotational axis of a door hinge.

PRIOR ART DOCUMENTS

Patent Documents

Patent Document 1: Japanese Patent Application Laid-Open No. 2014-99974
Patent Document 2: Japanese Patent Application Laid-Open No. 11-198742

SUMMARY

Problem to be Solved by the Invention

When the electrical wires are disposed in a position away from the rotational axis of the door hinge as described in Patent Document 1, a route difference occurs in accordance opening and closing of the door. The electrical wires are normally disposed to be movable to absorb this route difference. In this case, when the electrical wire bundle made up of the plurality of electrical wires bundled together is routed between the vehicle body and the door as described in Patent Document 1, a movable amount of the electrical wires disposed in a position away from the rotational axis of the door hinge in the electrical wire bundle is larger than that of the electrical wires disposed closer to the door hinge.

Accordingly, an object is to provide a technique capable of reducing a movable amount of electrical wires disposed between two members rotatably connected to each other.

Means to Solve the Problem

An arrangement structure of a wiring member according to the present disclosure includes: a first member; a second member connected to the first member to be rotatable around a rotational axis; and a plurality of electrical wires having a part disposed at least between the first member and the second member, wherein the plurality of electrical wires are disposed in parallel to each other in a direction in which the rotational axis extends in the part of the plurality of electrical wires disposed between the first member and the second member.

Effects of the Invention

According to the present disclosure, a movable amount of the electrical wires disposed between the first and second members rotatably connected to each other can be reduced.

DESCRIPTION OF EMBODIMENT(S)

Description of Embodiment of Present Disclosure

Embodiments of the present disclosure are listed and described firstly.

An arrangement structure of a wiring member according to the present disclosure is as follows.

(1) An arrangement structure of a wiring member includes: a first member; a second member connected to the first member to be rotatable around a rotational axis; and a plurality of electrical wires having a part disposed at least between the first member and the second member, wherein the plurality of electrical wires are disposed in parallel to each other in a direction in which the rotational axis extends in the part of the plurality of electrical wires disposed between the first member and the second member.

The plurality of electrical wires are disposed in parallel to each other in the direction in which the rotational axis extends in the part of the plurality of electrical wires disposed between the first member and the second member, thus the electrical wire farther away from the axis than the other electrical wire hardly occurs in the plurality of electrical wires. Accordingly, a movable amount of the electrical wires disposed between the first and second members rotatably connected to each other can be reduced.

(2) In the arrangement structure of the wiring member, it is preferable that the first member is a vehicle body and the second member is a door. The reason is that the movable amount of the electrical wires disposed between the vehicle body and the door can be reduced.

(3) It is sufficient that in the arrangement structure of the wiring member, the plurality of electrical wires extend in parallel to each other also in the part of the plurality of electrical wires disposed in the door. The reason is that achievable is a configuration that the plurality of electrical wires extend in parallel to each other in a range from the part disposed in the door to the part disposed between the vehicle body and the door.

Details of Embodiment of Present Disclosure

Specific examples of an arrangement structure of a wiring member of the present disclosure are described hereinafter with reference to the drawings. The present invention is not limited to these examples, but is indicated by claims, and it is intended that meanings equivalent to claims and all modifications within a scope of claims are included.

Figure 1:
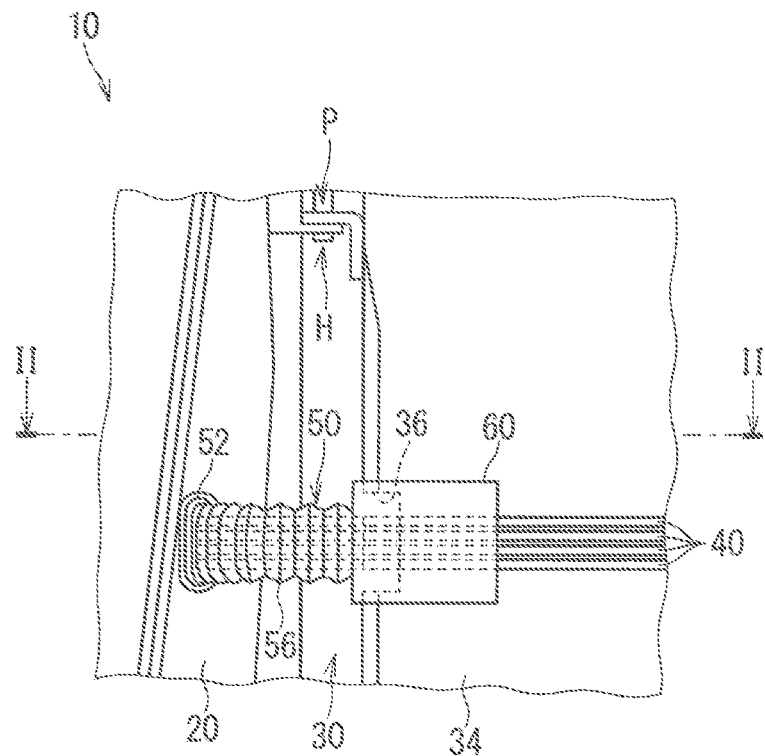
FIG. 1 is a side view illustrating an arrangement structure of a wiring member according to an embodiment.
Figure 2:
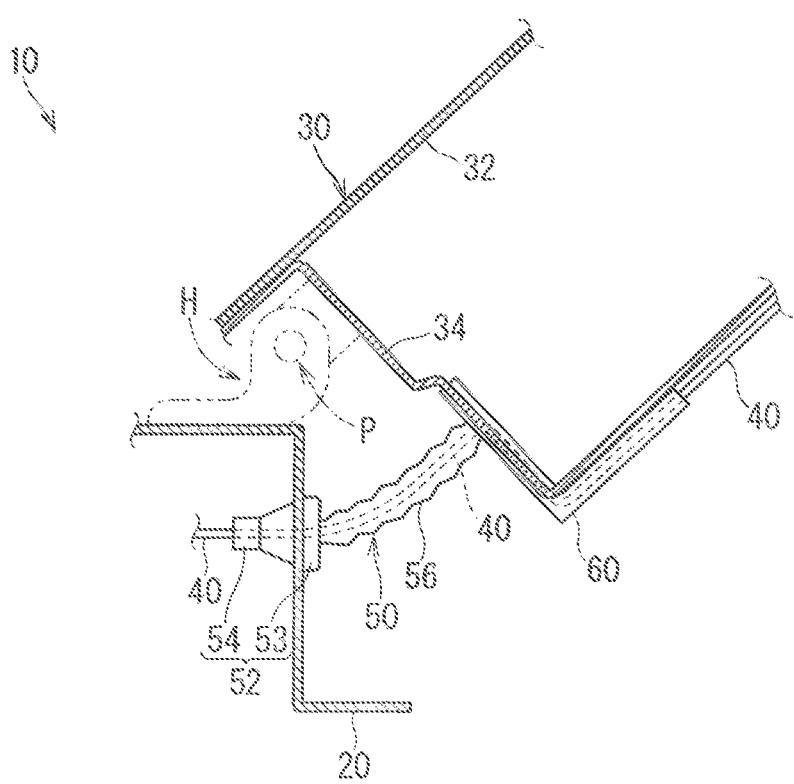
FIG. 2 is a cross-sectional view of the arrangement structure cut along a II-II line in FIG. 1.
Figure 3:
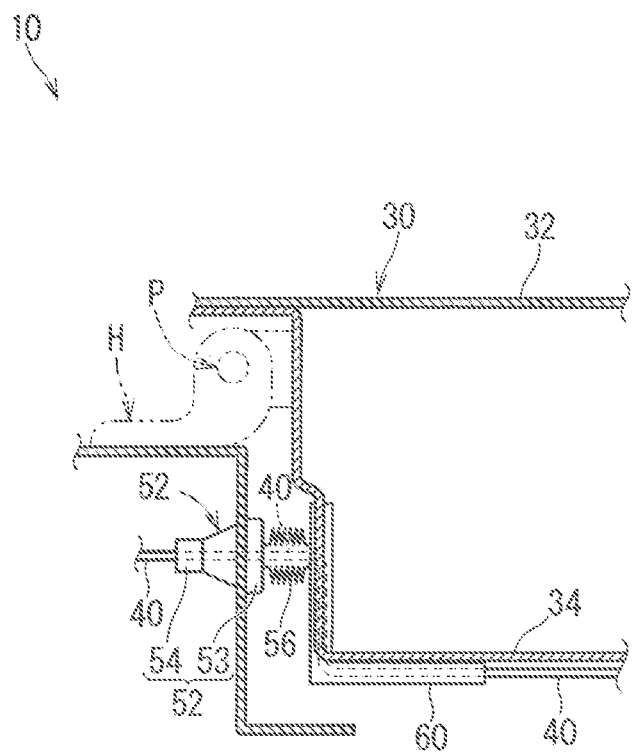
FIG. 3 is a cross-sectional view of a door in a closing state.

An arrangement structure of a wiring member according to an embodiment is described hereinafter. FIG. 1 is a side view illustrating an arrangement structure 10 of a wiring member according to an embodiment. FIG. 1 is a drawing of a door 30 viewed from an interior side in a state where the door 30 is opened in a vehicle. FIG. 2 is a cross-sectional view of the arrangement structure 10 cut along a II-II line in FIG. 1. FIG. 3 is a cross-sectional view viewed from a direction similar to that in FIG. 2, and is a cross-sectional view of the door 30 in a closing state. FIG. 2 and FIG. 3 are drawings viewed from an extension direction of a rotational axis P of a door hinge H.

The arrangement structure 10 of the wiring member includes a first member 20, a second member 30, and a plurality of electrical wires 40. The first member 20 and the second member 30 are members connected to each other to be rotatable around the rotational axis P. The plurality of electrical wires 40 have a part disposed at least between the first member 20 and the second member 30. The plurality of electrical wires 40 are disposed in parallel to each other in a direction in which the rotational axis P) extends in the part of the plurality of electrical wires 40 disposed between the first member 20 and the second member 30. The part of the plurality of electrical wires 40 disposed between the first member 20 and the second member 30 are referred to as the passage part hereinafter. A part of the plurality of electrical wires 40 disposed in the first member 20 is referred to as a first member arrangement part, and a part thereof disposed in the second member 30 is referred to as a second member arrangement part.

Used in the description hereinafter is an example that the first member 20 is a vehicle body 20 and the second member 30 is the door 30. The vehicle body 20 and the door 30 are connected to each other to be rotatable (pivotable) with the door hinge H therebetween. The passage part of the plurality of electrical wires 40 is a part disposed between the vehicle body 20 and the door 30. The plurality of electrical wires 40 are disposed in parallel to each other in a direction in which the rotational axis P (the pivot P) extends in the door hinge H in the passage part of the plurality of electrical wires 40.

The door 30 includes an outer panel 32 and an inner panel 34. The outer panel 32 is provided in a part of the door 30 facing an outer side of the vehicle to constitute an appearance of the vehicle. The door 30 further includes a design trim (not shown) attached inside the inner panel 34. The door 30 may be the door 30 provided in a lateral portion of the vehicle body 20 or the door 30 provided in a rear portion of the vehicle body 20. The rotational axis P of the door hinge H may mainly extend along a vertical direction or may mainly extend along a horizontal direction.

The plurality of electrical wires 40 are a member for supplying electrical power to a component attached to the door 30 from a battery attached to the vehicle body 20, for example, or transmitting a signal between a component attached to the vehicle body 20 and a component attached to the door 30. In the present example, the plurality of electrical wires 40 are covering wires 40 each including a core wire 42 and a covering 44 for covering the core wire 42 (refer to FIG. 4). In the example illustrated in FIG. 1, the number of the plurality of electrical wires 40 is four, but may be two or three, or five or more is also applicable. As illustrated in FIG. 1 and FIG. 2, the plurality of electrical wires 40 are arranged in the direction in which the rotational axis P extends in a single row. When the large number of the electrical wires 40 are arranged, the plurality of electrical wires 40 may be arranged in a plurality of rows away from each other in a direction of the rotational axis P and an extended line thereof. That is to say, when the large number of the electrical wires 40 are arranged, the plurality of electrical wires 40 may be arranged in the direction in which the rotational axis P extends in a plurality of rows in the passage part. It is sufficient that the plurality of electrical wires 40 are flatly arranged in the passage part.

As illustrated in FIG. 2, the passage part in the plurality of electrical wires 30 is provided in a position away from the rotational axis P when viewed from the direction in which the rotational axis P extends. Thus, a route difference occurs in the plurality of electrical wires 40 and a length of the passage part changes between a case where the door 30 is in an open state and a case where the door 30 is in a closing state. An extra length part is provided in the plurality of electrical wires 40, thus a difference in a length dimension of the passage part between the case where the door 30 is in the open state and the case where the door 30 is in the closing state can be absorbed. That is to say, the extra length part occurs in the plurality of electrical wires 40 when the length of the passage part is small (when the door 30 is the closing state). When the length of the passage part is increased (when the door 30 enters the open state), a part of the extra length part is used for the passage part, thus the length of the passage part can be increased. The extra length part may be provided in the passage part, the first member arrangement part, or the second member arrangement part. When the extra length part is provided in the first member arrangement part or the second member arrangement part, it is sufficient that the passage part is provided to be housed in and pulled out of the first member arrangement part or the second member arrangement part.

The plurality of electrical wires 40 are or are not passed through a hole at an end portion of the passage part, for example, in some cases. In the description herein, the plurality of electrical wires 40 are passed through a hole formed in the vehicle body 20 at one end portion of the passage part. In the description herein, the plurality of electrical wires 40 are not passed through a hole formed in the door 30 at the other end portion of the passage part. Specifically, a concave portion 36 concaved from a main surface (a surface directed to an inner side of a vehicle interior) toward a side surface (a surface directed to a front-back direction of the vehicle body 20) in the inner panel 34 of the door 30. A part of the plurality of electrical wires 40 including the other end portion of the passage part is fitted in the concave portion 36 together with a door attachment part 60 described hereinafter. Accordingly, the other end portion of the passage part reaches the side surface (the surface directed to the front-back direction of the vehicle body 20) in the inner panel 34 of the door 30, and then extends toward a side of the main surface in a curved form. The other end portion of the passage part reaches the inner side of the vehicle interior in relation to the main surface, and then extends along the main surface in a curved form.

The attaching member 50 is attached to the plurality of electrical wires 40. The attaching member 50 includes a vehicle body attachment part 52, a passage part protection part 56, and the door attachment part 60. The vehicle body attachment part 52 is a part provided in a region including one end portion of the passage part to attach a part including one end portion of the passage part to the vehicle body 20. The passage part protection part 56 is a part provided in at least an intermediate portion of the passage part to protect the passage part. The door attachment part 60 is a part provided in a region including the other end portion of the passage part to attach a part including the other end portion of the passage part to the door 30. The attaching member 50 may be an integrally-molded component or a member formed by a combination of a plurality of separately-molded components.

The vehicle body attachment part 52 is a member fitted into a hole formed in the vehicle body 20. For example, the vehicle body attachment part 52 is formed into a cylindrical shape having a large-diameter cylindrical part 53 and a small-diameter cylindrical part 54. The plurality of electrical wires 40 are passed inside the vehicle body attachment part 52. The vehicle body attachment part 52 is an integrally-molded component formed of a material such as rubber or elastomer, for example. A member such as the vehicle body attachment part 52 fitted into the hole to cover and protect an outer periphery of the electrical wires 40 passed through the hole is also referred to as a grommet, for example. The plurality of electrical wires 40 are arranged in parallel to each other inside the vehicle body attachment part 52. In this case, it is sufficient that a horizontal section in the vehicle body attachment part 52 is flatly formed in a direction in which the plurality of electrical wires 40 are arranged.

The large-diameter cylindrical part 53 is a part attached to the vehicle body 20. A peripheral groove is formed in a peripheral surface of the large-diameter cylindrical part 53. A peripheral edge portion of the hole is fitted into the peripheral groove, thus the vehicle body attachment part 52 is fitted into the hole formed in the vehicle body 20 to be attached to the vehicle body 20.

The small-diameter cylindrical part 54 is a part attached to the plurality of electrical wires 40. For example, an adhesive tape, for example, is wound around the small-diameter cylindrical part 54 and a part of the plurality of electrical wires 40 extending from an end portion of the small-diameter cylindrical part 54 in a state where the plurality of electrical wires 40 is passed in the small-diameter cylindrical part 54, thereby attaching the small-diameter cylindrical part 54 to the plurality of electrical wires 40.

The large-diameter cylindrical part 53 of the vehicle body attachment part 52 is made up of a vehicle body locking part formed of a material such as rigid resin and a sealing part formed of a material such as rubber or elastomer, for example, in some cases. The vehicle body locking part includes a cylindrical part fitted into the hole formed in the vehicle body 20 and a locking claw formed to be elastically deformable on an outer surface of the cylindrical part. The locking claw is locked to a peripheral edge part of the hole formed in the vehicle body 20 from an inner side of the vehicle body 20 in a state where the cylindrical part is fitted into the hole formed in the vehicle body 20. The sealing part is combined with the vehicle body locking part. The sealing part has annularly contact with the peripheral edge part of the hole formed in the vehicle body 20 in a whole circumferential direction from a side opposite to the locking claw to suppress ingress of water, for example, from the hole formed in the vehicle body 20 into the vehicle body 20.

When there is a low necessity of suppressing the ingress of water, for example, from the hole formed in the vehicle body 20 into the vehicle body 20, a member made of a material such as rubber or elastomer, for example, may not be adopted as the vehicle body attachment part 52.

The passage part protection part 56 is formed into a cylindrical shape. The passage part protection part 56 is formed into a flat shape in a horizontal section. Herein, the length of the passage part is different between the case where the door 30 is in the open state and the case where the door 30 is in the closing state. A direction in which the passage part extends is different between the case where the door 30 is in the open state and the case where the door 30 is in the closing state. Thus, the passage part protection part 56 is formed to be able to be expanded, contracted, and bended. The passage part protection part 56 is formed into an accordion cylindrical shape, for example, thereby being able to be expanded, contracted, and bended. Herein, the passage part protection part 56 is integrally molded with the vehicle body attachment part 52. Herein, the plurality of electrical wires 40 are arranged in parallel to each other inside the passage part protection part 56. In this case, it is sufficient that the horizontal section in the passage part protection part 56 is flatly formed in a direction in which the plurality of electrical wires 40 are arranged.

The door attachment part 60 attaches the part including the other end portion of the passage part to the door 30. The door attachment part 60 is formed into an L-like cylindrical shape. One end side part of the L-like shape is a part fitted into the concave portion 36 formed in the inner panel 34. One end side part of the L-like shape is provided to be able to be fitted into the concave portion 36 formed in the inner panel 34 from an outer side of the inner panel 34. The other end side part of the L-like shape spreads and extends along a main surface of the inner panel 34. The part including the other portion of the passage part in the plurality of electrical wires 40 is passed in the door attachment part 60, thus a route of the part including the other end portion of the passage part is regulated to have the L-like shape. For example, the door attachment part 60 includes a first part covering the plurality of electrical wires 40 arranged in parallel from one side and a second part covering the plurality of electrical wires 40 arranged in parallel from the other side. For example, the first part is integrally molded with the passage part protection part 56 and the vehicle body attachment part 52. The second part is formed to have higher rigidity than the first part, and is attached to the inner panel 34, for example. Herein, the plurality of electrical wires 40 are arranged in parallel to each other inside the door attachment part 60. In this case, it is sufficient that the horizontal section in the door attachment part 60 is flatly formed in a direction in which the plurality of electrical wires 40 are arranged.

There may also be a case where the other end portion of the passage part is passed through the hole formed in the inner panel 34 of the door 30. In this case, the door attachment part 60 is considered to be formed into a shape similar to that of the vehicle body attachment part 52 described above.

The plurality of electrical wires 40 may extend in a flat form while keeping the arrangement in the passage part in the first member arrangement part, or may also extend in a bundle to have a circular cross section. When the plurality of electrical wires 40 extend in the flat form in the first member arrangement part, the plurality of electrical wires 40 may be arranged side by side and fixed to a sheet-like member to keep the flat form. When the plurality of electrical wires 40 are bundled to have a circular cross section and extend in the first member arrangement part, it is applicable that the plurality of electrical wires 40 are not fixed to a sheet-like member but are bundled by a banding member, for example, thereby keeping a state of being bundled to have a circular cross section, or the plurality of electrical wires 40 flatly fixed to a sheet-like member are bended to have a form of so-called sushi roll to keep a state of being bundled to have a circular cross section, for example.

The plurality of electrical wires 40 extend in parallel to each other also in a part of the plurality of electrical wires 40 disposed in the door 30. That is to say, the plurality of electrical wires 40 extend in a flat state while keeping the arrangement in the passage part in the second member arrangement part. In the example illustrated in FIG. 1, the second member arrangement part passes closer to the inner side of the vehicle interior in relation to the inner panel 34 of the door 30 toward each component of the door 30. The design trim is provided closer to the inner side of the vehicle interior in relation to the inner panel 34. The second member arrangement part extends through a portion between the inner panel 34 and the design trim. For example, the plurality of electrical wires 40 may be fixed side by side to a plate-like member provided between main surfaces of the inner panel 34 and the design trim to cover the main surface of the inner panel 34, thereby keeping the flat form in the second member arrangement part. At this time, the second member arrangement part may be appropriately branched on a plate-like member 80 and extend toward each component of the door 30. The plurality of electrical wires 40 may also extend in a bundle to have a circular cross section in the second member arrangement part.

The arrangement structure 10 of the wiring member is considered to have a flattened member for keeping the plurality of electrical wires 40 in a flat arrangement in the passage part. The flattened member is a member attached to the plurality of electrical wires 40 to keep the plurality of electrical wires 40 in a flat state.

Figure 4:
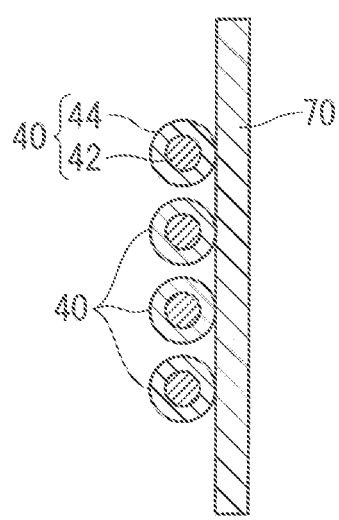
FIG. 4 is a cross-sectional view illustrating an example of a flattened member.

For example, the flattened member is a sheet-like member 70 as illustrated in FIG. 4. In this case, the plurality of electrical wires 40 are fixed side by side to the sheet-like member 70, thus the plurality of electrical wires 40 are held in the flat state. A fixing state of the electrical wires 40 and the sheet-like member 70 is not particularly limited, but also applicable is a configuration that a covering 44 and the sheet-like member 70 are directly fixed to each other by welding, for example, a configuration that the electrical wires 40 and the sheet-like member 70 are indirectly fixed to each other with an inclusion such as an adhesive agent or a double-sided adhesive tape, or a configuration that the electrical wires 40 are pressed against a sheet member by a sewing thread or a one-sided adhesive tape, for example.

Figure 5:
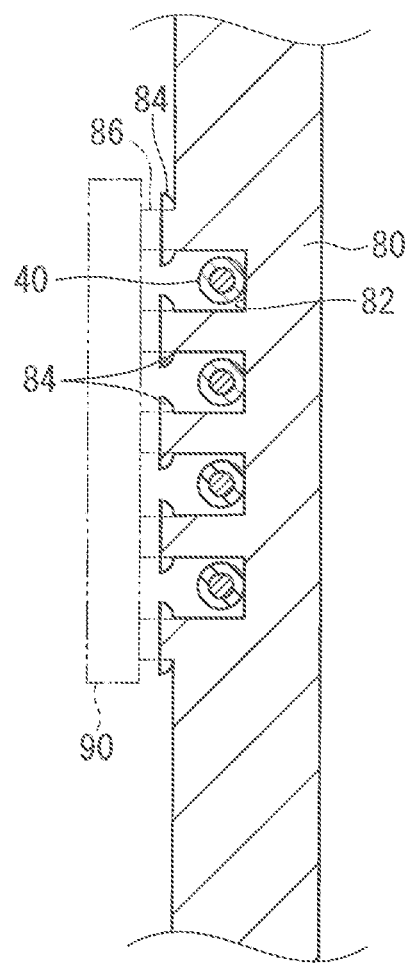
FIG. 5 is a cross-sectional view illustrating another example of the flattened member.

For example, the flattened member is a plate-like member 80 in which a holding groove 82 is formed in a main surface as illustrated in FIG. 5. In this case, the plurality of electrical wires 40 are housed in a groove formed in the plate-like member 80, thus the plurality of electrical wires 40 are held in the flat state. One groove may be formed to collectively house the plurality of electrical wires 40. It is also applicable that the plurality of grooves are formed, and the plurality of grooves house the plurality of electrical wires 40 separately in a plurality of groups, or house the plurality of electrical wires 40 separately one by one. It is sufficient that the plurality of electrical wires 40 are held in the holding groove 82 so as to be able to move along a longitudinal direction thereof. For example, it is considered that a blocking part 84 blocks an opening part of the holding groove in the state where the electrical wires 40 are housed in the holding groove 82 to hold the electrical wires 40 in the holding groove. In this case, the electrical wire 40 can move in the longitudinal direction in the holding groove, and the blocking part 84 can prevent the electrical wires 40 from coming out of the holding groove. The blocking part 84 may be formed of a rib 86, which is provided to protrude from an area around the holding groove, crushed by a thermal pressurizing member 90 as illustrated in FIG. 5, or formed by adhering an adhesive tape, for example.

The flattened member is a both side covering member covering and holding the plurality of electrical wires 40 from both sides. In this case, the both side covering member includes a first covering part and a second covering part each covering the plurality of electrical wires 40 from the both sides. A route keeping the plurality of electrical wires 40 in a flat form is formed between the first covering part and the second covering part. The door attachment part 60 described above is an example of the both side covering member.

A position where the flattened member is provided is not particularly limited. The flattened member may be provided in the passage part, the first member arrangement part, or the second member arrangement part. For example, the flattened member may be or may not be provided inside the passage part protection part 56. For example, the flattened member may be or may not be provided inside the attaching member 50.

According to the present disclosure, the plurality of electrical wires 40 are disposed in parallel to each other in the direction in which the rotational axis P extends in the part of the plurality of electrical wires 40 disposed between the first member 20 and the second member 30, thus the electrical wire 40 farther away from the axis than the other electrical wire 40 hardly occurs in the plurality of electrical wires 40. Accordingly, a movable amount of the electrical wires 40 disposed between the first and second members 20 and 30 rotatably connected to each other can be reduced. In this case, a shape of the passage part protection part 56 can be simplified. That is to say, a movable amount of the electrical wires 40 disposed between the first and second members 30 rotatably connected to each other can be reduced, thus a dimension of expansion and contraction of the passage part protection part 56 can be reduced, and the shape of the passage part protection part 56 is simplified.

The first member 20 is the vehicle body 20 and the second member 30 is the door 30, thus the movable amount of the electrical wires 40 disposed between the vehicle body 20 and the door 30 can be reduced. The plurality of electrical wires 40 extend in parallel to each other also in the part of the plurality of electrical wires 40 disposed in the door 30, thus achievable is a configuration that the plurality of electrical wires 40 extend in parallel to each other in a range from the part disposed in the door 30 to the part disposed between the vehicle body 20 and the door 30.

[Additional Statement]

Figure 6:
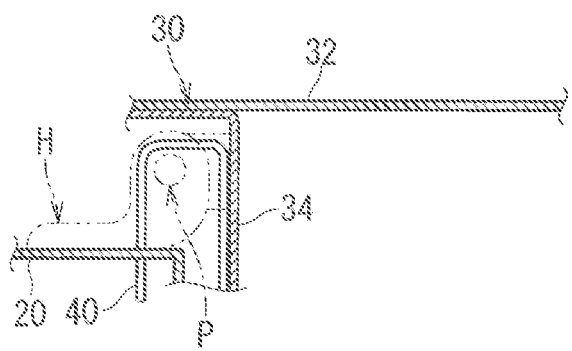
FIG. 6 is a cross-sectional view illustrating a modification example of a route of a plurality of electrical wires.

FIG. 6 is a cross-sectional view illustrating a modification example of a route of the plurality of electrical wires 40. In the example illustrated in FIG. 6, the plurality of electrical wires 40 are disposed in a position close to the rotational axis P in the passage part compared with the example described in the embodiment. There may be a case where the plurality of electrical wires 40 extend to overlap with the rotational axis P, that is to say, extend across an extension part of the rotational axis P. In these cases, a route difference in the passage part between the case where the door 30 is in the open state and the case where the door 30 is in the closing state is reduced, and the movable amount of the electrical wires 40 is reduced. Thus, the dimension of the expansion and contraction of the passage part protection part 56 can be reduced, and there may also be a case where the passage part protection part 56 needs not be expanded and contracted. As a result, the shape of the passage part protection part 56 can be simplified. Specifically, it is sufficient that the passage part protection part 56 is formed of a material such as rubber, elastomer, and a soft resin so as to be able to be bent, and it is also considered that a longitudinal section thereof does not have an accordion shape but has a flat shape, that is to say, the same horizontal section continues in the longitudinal direction.

Furthermore, in the above description, the plurality of electrical wires 40 are separated covering wires 40, however, this configuration is not necessary. Some or all of the plurality of electrical wires 40 may be a flexible flat cable made up of a plurality of core wires 42 collectively covered by the common covering 44, for example.

In the above description, the first member 20 is the vehicle body 20, and the second member 30 is the door 30, however, this configuration is not necessary. For example, the first member 20 may be a seating face part of a seat, and the second member 30 may be a backrest part of a seat. For example, the first member 20 may be a housing body part formed into a box-like shape in a box-like housing part such as an armrest, and the second member 30 may be a lid part covering an opening part of the housing body part in the box-like housing part such as the armrest. It is sufficient that the first member 20 and the second member 30 are rotatably connected to each other in a vehicle.

Each configuration described in the embodiment and each modification example can be appropriately combined as long as they are not contradictory.

EXPLANATION OF REFERENCE SIGNS

10 arrangement structure of wiring member
20 first member (vehicle body)
30 second member (door)
32 outer panel
34 inner panel
36 concave portion
40 electrical wire
42 core wire
44 covering
50 attaching member
52 vehicle body attachment part
53 large-diameter cylindrical part
54 small-diameter cylindrical part
56 passage part protection part
60 door attachment part
70 sheet-like member
80 plate-like member
82 holding groove
84 blocking part
86 rib
H door hinge
P rotational axis

The invention claimed is:

1. An arrangement structure of a wiring member, comprising:
   a vehicle body;
   a door connected to the vehicle body to be rotatable around a rotational axis;
   a plate member in which at least one holding groove is provided in a surface of the plate member; and
   a plurality of covering wires having a part disposed at least between the vehicle body and the door, wherein
   the plurality of covering wires are housed in the at least one holding groove of the plate member such that the plurality of covering wires are held in a flat state,
   the plurality of covering wires are disposed in parallel to each other and arranged side by side each other in a direction in which the rotational axis extends in the part of the plurality of covering wires disposed between the vehicle body and the door,
   a grommet fitted into a hole of the vehicle body is provided in a part of the plurality of covering wires passed through the hole of the vehicle body,
   the plurality of covering wires extend in parallel to each other in the grommet,
   the grommet is flatly formed in a direction in which the plurality of covering wires are arranged, and
   the plurality of covering wires extend in a bundle to have a circular cross section in a part disposed in the vehicle body.

2. The arrangement structure of the wiring member according to claim 1, wherein
   the plurality of covering wires extend in parallel to each other also in a part of the plurality of covering wires disposed in the door.

3. The arrangement structure of the wiring member according to claim 1, wherein the at least one holding grooves comprises a plurality of holding grooves provided in the surface of the plate member.

4. The arrangement structure of the wiring member according to claim 3, wherein the plurality of covering wires are housed in the plurality of holding grooves separately one by one.

5. An arrangement structure of a wiring member, comprising:
   a vehicle body;
   a door connected to the vehicle body to be rotatable around a rotational axis;
   a single sheet member; and
   a plurality of covering wires having a part disposed at least between the vehicle body and the door, wherein
   the plurality of covering wires are disposed in parallel to each other and are arranged side by side each other in a direction in which the rotational axis extends in the part of the plurality of covering wires disposed between the vehicle body and the door,
   a grommet fitted into a hole of the vehicle body is provided in a part of the plurality of covering wires passed through the hole of the vehicle body,
   the plurality of covering wires extend in parallel to each other in the grommet,
   the plurality of covering wires are fixed side by side to the single sheet member such that the plurality of covering wires are held in a flat state,
   one side of the plurality of covering wires in the flat state is attached to the sheet member such that the sheet member is interposed between the one side of the plurality of covering wires and an inner surface of the grommet, and another side of the plurality of covering wires in the flat state is exposed such that the other side of the plurality of covering wires in the flat state faces the inner surface of the grommet,
   the grommet is flatly formed in a direction in which the plurality of covering wires are arranged, and
   the plurality of covering wires extend in a bundle to have a circular cross section in a part disposed in the vehicle body.

* * * * *